United States Patent
Tanaka

[11] 3,992,083
[45] Nov. 16, 1976

[54] VARIABLE FOCAL LENGTH OPTICAL SYSTEM OF SUPER-HIGH MAGNIFICATION RATIO

[75] Inventor: Kimio Tanaka, Kanagawa, Japan

[73] Assignee: Canon Kabushiki Kaisha, Tokyo, Japan

[22] Filed: June 4, 1975

[21] Appl. No.: 583,557

Related U.S. Application Data

[63] Continuation of Ser. No. 453,508, March 21, 1974, abandoned.

[30] Foreign Application Priority Data

Mar. 23, 1973 Japan.................... 48-33312

[52] U.S. Cl............................. 350/184; 350/187
[51] Int. Cl.$^2$............................. G02B 15/00
[58] Field of Search......... 350/184, 186, 187, 40–44

[56] References Cited
UNITED STATES PATENTS

| | | | |
|---|---|---|---|
| 3,015,988 | 1/1962 | Hemstreet........................ | 350/184 |
| 3,081,671 | 3/1963 | Cook ............................. | 350/186 |
| 3,603,726 | 9/1971 | Garber et al...................... | 350/184 |
| 3,619,035 | 11/1971 | Hopkins........................... | 350/43 |

FOREIGN PATENTS OR APPLICATIONS

| | | |
|---|---|---|
| 2,259,723 | 10/1974 | Germany |
| 40-2871 | 1/1965 | Japan |

*Primary Examiner*—John K. Corbin
*Assistant Examiner*—Conrad Clark
*Attorney, Agent, or Firm*—Toren, McGeady and Stanger

[57] ABSTRACT

A variable focus objective lens having a magnification range in the order of 1 : 30 and greater and having two pairs of relatively movable members which objective consists of a front assembly and a rear assembly which includes one of the two pairs of movable members to which consecutive zooming movement is imparted. This is done in order to add a varifocal range to a varifocal range of zooming movement of the movable members of the front assembly, in association with a control mechanism of simple structure incorporated in barrels of the lens mount therefor.

3 Claims, 9 Drawing Figures

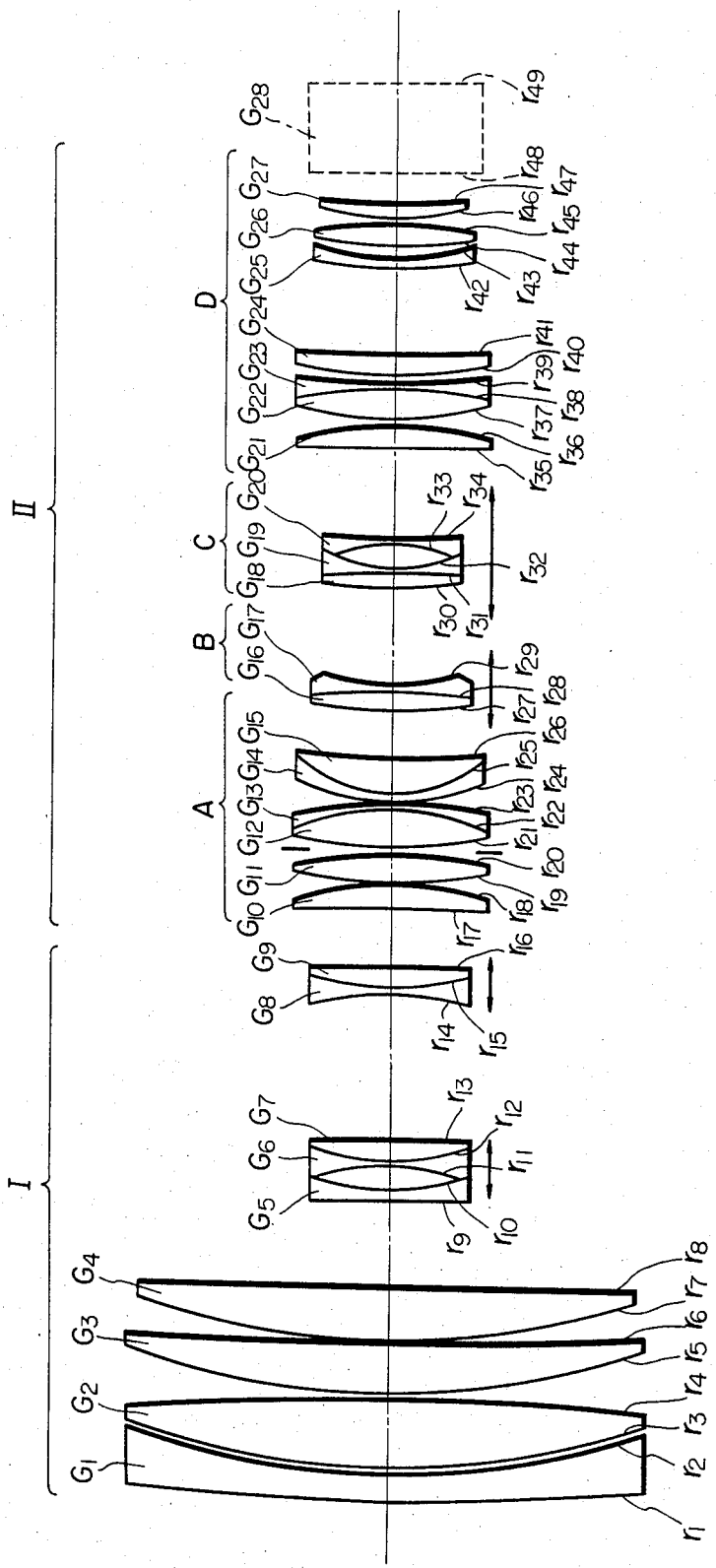

SPHERICAL ABERRATION $f = 24$ $f = 234.2$ $f = 800$

ASTIGMATISM

DISTORTION ABERRATION

VARIABLE FOCAL LENGTH OPTICAL SYSTEM OF SUPER-HIGH MAGNIFICATION RATIO

This is a Continuation of application Ser. No. 453,508, filed Mar. 21, 1974, now abandoned.

This invention relates to a variable magnification optical system having a variable equivalent focal length lying within a magnification range of more than 30, and more particularly, it relates to a mechanically-compensated variable magnification objective optical system having four consecutively movable members in association with a control mechanism of extremely simple structure.

Various types of zoom objectives are known for photographic and television-transmitting cameras, most of which may conveniently be considered as comprising front and rear assemblies of which the front assembly includes a front member which is axially movable to effect focusing to suit differing object positions, and relatively movable members for zooming, i.e., variator and compensator, whereby the equivalent focal length of the complete objective can be continuously varied through a range while maintaining constant the position of the image plane. In such type the members of the rear assembly remain stationary as far as zooming is concerned. With such a lens configuration though, it is quite difficult to design a zoom objective having both adequate correctional properties and a zooming range in excess of about ten times its minimum focal length. To extend further the verifocal range of the zoom objective of configuration described, it has heretofor been a common practice to mount a converter front or rear attachment thereon, or to modify the objective to a convertible objective having an interchangeable rear assembly.

FIGS. 1A and 1B illustrate the former practice in which converter front and rear attachments 11, 12 are about to be mounted in front and in rear of objectives 1, 10 respectively.

The inconvenience encountered by the necessity of changing objectives to effect a change in the magnification range has prejudiced the usefulness of zoom objectives in some applications, such as broadcast television because of the discontinuity of the image. Another disadvantage of the converter attachment type of zoom objective is that the size of the objective is increased by the attachment of a converter and is space-consuming. On the other hand, the conversion type of zoom objective also has another disadvantage of making the construction of the objective complicated.

The present invention has for a general object to eliminate and overcome the above mentioned inconvenience and disadvantages and for a more specific object to provide a variable magnification objective optical system of which the equivalent focal length can be continuously varied throughout an extremely extended range in association with a control mechanism of extremely simple structure. This is achieved by use of coaxially aligned four movable members disposed behind a focusing front member in association with a lens barrel having four circumferential camming grooves formed in the inside thereof journally mounted on a sleeve having four guiding slots. By such axial movement of the four movable members is governed in the manner such that relative axial movement of two movable members adjacent to each other is consecutively followed by relative axial movement of the other two movable members adjacent to each other to extend the varifocal range of the whole system.

In order to make the invention clearly understood, reference will now be made to the accompanying drawings which are given by way of example and in which:

FIG. 2 is a diagrammatic view of an objective optical system according to a preferred form of the present invention.

Figure 1A:
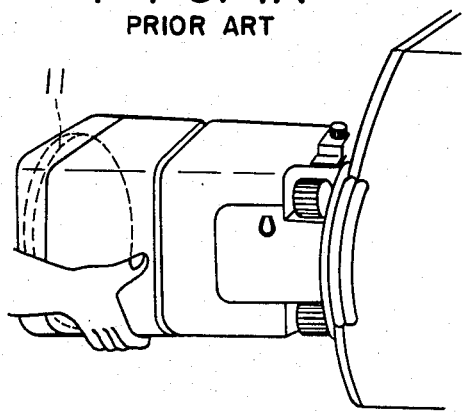
FIGS. 1A and 1B are perspective views or prior art zoom objectives connected to television cameras and having, respectively, converter front and rear attachments which are about to be mounted thereon.
Figure 1B:
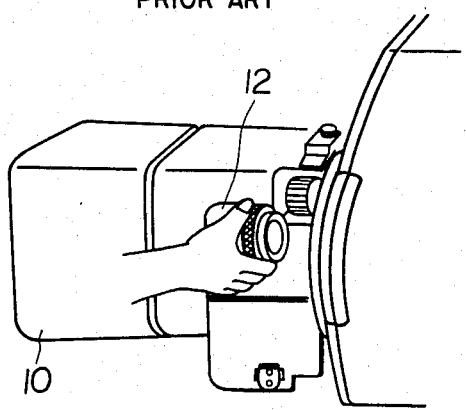
Figure 3A:
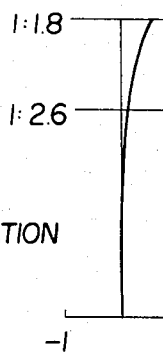
FIGS. 3A–3B illustrates various aberration curves of the objective optical system of FIG. 2.
Figure 3B:
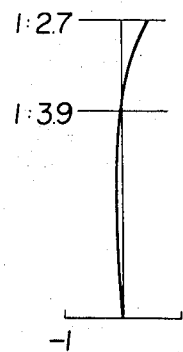
Figure 3C:
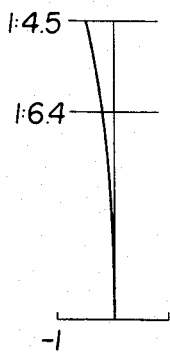
Figure 3D:
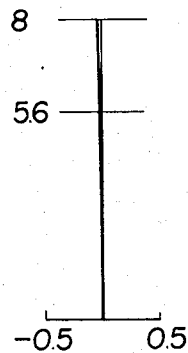
Figure 3E:
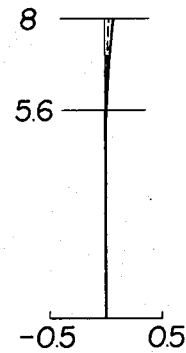
Figure 3F:
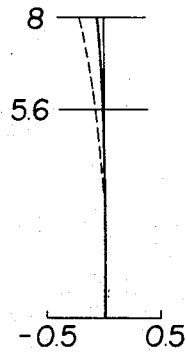
Figure 3G:
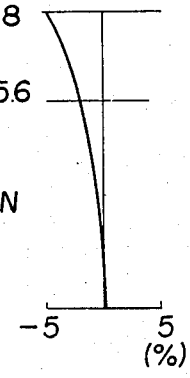
Figure 3H:
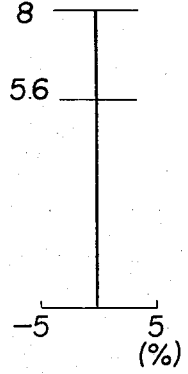
Figure 3I:
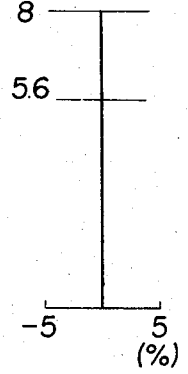

Referring to FIG. 2 an objective optical system in accordance with an embodiment of the present invention is illustrated as comprising a front assembly I followed by a rear assembly II with consists of four members, the front one, A, of which is stationary during zooming, the middle two, B and C, of which are axially movable to produce the zooming effect. In this instance, the axial movement of the rear member C causes a part of the variation in equivalent focal length of the system while compensation for that part of the image shift caused by the movement of member C is effected by the axial movement of the front member B to maintain a fixed focal plane through the entire focal length range, and the innermost one D of which is stationary. The movable members B and C, i.e., compensator B and variator C are arranged in such manners that the compensator B and variator C are divergent, and that an axial pencil of rays passing through the front assembly I and the stationary front member A converges to compensator B and variator C but in a smaller angular extent than the former and diverges from variator C at any point in the entire focal length range. This provides an advantage of minimizing the diameters of both compensator B and variator C in the rear assembly II. This advantage gives rise to the possibility of minimizing the physical length of the rear assembly II by use of a variator C having a minimum focal length necessary to minimize the zooming length of movement thereof.

As the variator C is moved, remarkable variation of various residual aberrations is produced unless the variator C in itself is somewhat well corrected for various aberrations. The variator C must have an equivalent focal length $f_c$ written as an inequality as follows.

$$0.5f < |f_c| < 4f$$

wherein $f$ is the equivalent focal length of the whole system consisting of the front and rear assemblies in the minimum focal length setting. When the lower limit is violated, residual aberrations are objectionably increased. When the upper limit is violated the physical length of the rear assembly which is dependent on the zooming length of movement of the variator C is unacceptable.

For correction of chromatic aberrations as well as the minimization of Petzval's sum and stabilization of spherical aberration, coma and distortion with zooming, the variator C preferably includes at least one convergent element, in this instance, a double convex element, and one or more divergent elements, in this instance, two double concave elements, the assembly of the elements having at least two divergent refracting surfaces and one convergent refracting surface, the convergent and divergent elements being made either of a material or materials having a refractive index or indices of more than 1.75, or of materials having Abbe numbers or average Abbe numbers differing by at least 15 from each other.

The compensator B must have an equivalent focal length $f_B$ written as an inequality as follows:

$$|f_B| > |1.5 f_c|$$

or otherwise various residual aberrations will be objectionably increased. For stabilization of spherical aberration with zooming, the compensator B is preferably defined by a front surface of forward convexity and a rear surface of rearward concavity.

The rear stationary member D preferably includes convergent elements made of a material or materials having a refractive index or indices of less than 1.65 and divergent elements made of a material or materials having a refractive index or indices of more than 1.75, the elements in member D being divided into a front and rear part, the front part being provided with a divergent refracting surface of forward concavity and the rear part being provided with a divergent refractive surface of rearward concavity, for minimization of Petzval sum as well as for stabilization of spherical aberration, coma and distortion with zooming.

The front stationary member A has an equivalent focal length such that the position of the image plane for the front assembly I is suitable as the position of an object plane for the compensator B. Provision of such a front stationary member A in the rear assembly II is often preferred from the lens design standpoint, because a balance for stabilization of aberrations of the whole system with zooming may be adjusted by variation of cetain design parameters of the elements in the member A. However, if aberrations in the front assembly I are sufficiently stabilized with zooming as well as with focussing, and if the position of the image plane for the front assembly I is suitable as the position of an object plane for the compensator B, the stationary member A may be excluded.

Numerical data with respect to one specific embodiment of such an optical system adapted for use in a television transmitting camera are given in Table I, in which $r_1, r_2, \ldots$ designate the radii of curvature of the individual refracting surfaces counting from the front, the negative sign indicating that the surface is concave to the front; $d_1, d_2, \ldots$ designate the axial thicknesses of or air separations between the elements of the objective. The table also gives the refractive indices $n$ for the sodium D-line of the spectrum and the Abbe $\nu$ numbers of the materials of which the various elements of the objective are made, and in addition variable air spaces for shortest, intermediate and longest focal length positions and characteristics of a beam-splitting prism associated with the objective. Various aberrations of the optical system are shown in FIGS. 3a–3i.

Table I

Focal length: 24–800  Zoom ratio: 1:33.3
Aperture ratio: 1:1.8–1:4.5  Effective image diameter: 16

| | Lens | Radii | Thickness or axial separation | n | γ |
|---|---|---|---|---|---|
| I | 1 | 1086.39 | 8 | 1.7552 | 27.5 |
| | | 283.68 | 1.48 | | |
| | 2 | 280.91 | 23.31 | 1.51633 | 64.1 |
| | | −1173.26 | 0.2 | | |
| | 3 | 289.546 | 17.62 | 1.51633 | 64.1 |
| | | 1566.37 | 0.2 | | |
| | 4 | 278.268 | 13.27 | 1.51633 | 64.1 |
| | | 921.892 | * 0.5517–183.958–228.885 | | |
| | 5 | 364.93 | 3 | 1.816 | 46.8 |
| | | 70.69 | 9 | | |
| | 6 | −87 | 2.52 | 1.816 | 46.8 |
| | | 96.245 | | | |
| | 7 | −788.25 | 6 | 1.92286 | 20.9 |
| | | | * 235.681–29.5934–7.3484 | | |
| | 8 | −101.8 | 3.02 | 1.7859 | 44.2 |
| | | 100.08 | | | |
| | 9 | −3088 | 10 | 1.80518 | 25.4 |
| | | | * 5.9945–28.6778–5.9945 | | |
| II A | 10 | −2040 | 6 | 1.48749 | 70.1 |
| | | −104.18 | 0.2 | | |
| | 11 | 261.69 | 6.5 | 1.48749 | 70.1 |
| | | −200.33 | 3.511 | | |
| | 12 | 234.581 | 12.782 | 1.60311 | 60.7 |
| | | −88.1214 | | | |
| | 13 | −289.98 | 3.5 | 1.80518 | 25.4 |
| | | | 0.2 | | |
| | 14 | 79.5181 | 3 | 1.7552 | 27.5 |
| | 15 | 54.7653 | 10.476 | 1.62041 | 60.3 |
| | | 431.943 | * 13.1102–17.6795–16.5754 | | |
| B | 16 | 138.145 | 5.957 | 1.71736 | 29.5 |
| | | −633.921 | | | |
| | 17 | 59.18 | 2.5 | 1.72 | 50.3 |
| | | | * 7.1707–26.2014–43.7055 | | |
| C | 18 | 123.27 | 4.772 | 1.92286 | 21.3 |
| | | −382.77 | | | |
| | 19 | 69.0452 | 2.5 | 1.816 | 46.8 |
| | | −74.2236 | 6.815 | | |
| | 20 | 413.701 | 2.5 | 1.816 | 46.8 |
| | | | * 42.8562–19.2562–2.8562 | | |
| D | 21 | −600.211 | 7.766 | 1.70311 | 60.7 |
| | | −109.249 | 0.2 | | |
| | 22 | 146.829 | 11.823 | 1.60311 | 60.7 |
| | | −139.73 | | | |
| | 23 | 1373.05 | 3 | 1.80518 | 25.4 |
| | | | 0.2 | | |
| | 24 | 129.318 | 7.872 | 1.60311 | 60.7 |
| | | 1539.52 | 29.808 | | |
| | | 110.432 | | | |

Table I-continued

| | | | | |
|---|---|---|---|---|
| 25 | 70.8992 | 3 | 1.71766 | 29.5 |
| | 162.808 | 6.566 | | |
| 26 | | 6.778 | 1.51633 | 64.1 |
| | −360.162 | 0.2 | | |
| 27 | 79.4534 | 7.974 | 1.51633 | 64.1 |
| | 347.566 | 20 | | |
| | 0 | | | |
| Prism | | 69.2 | 1.51633 | 64.1 |
| | 0 | | | |

The values marked by * represent the shortest, intermediate and longest focal lengths.

Figure 4:
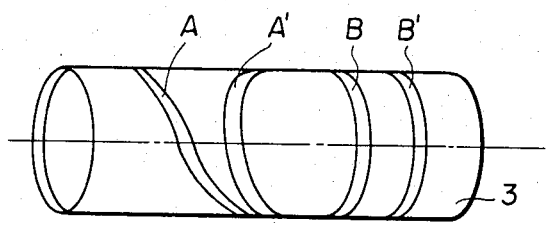
FIG. 4 is a perspective view of the inside surface of a cam barrel having circumferential camming grooves formed therein.
Figure 5:
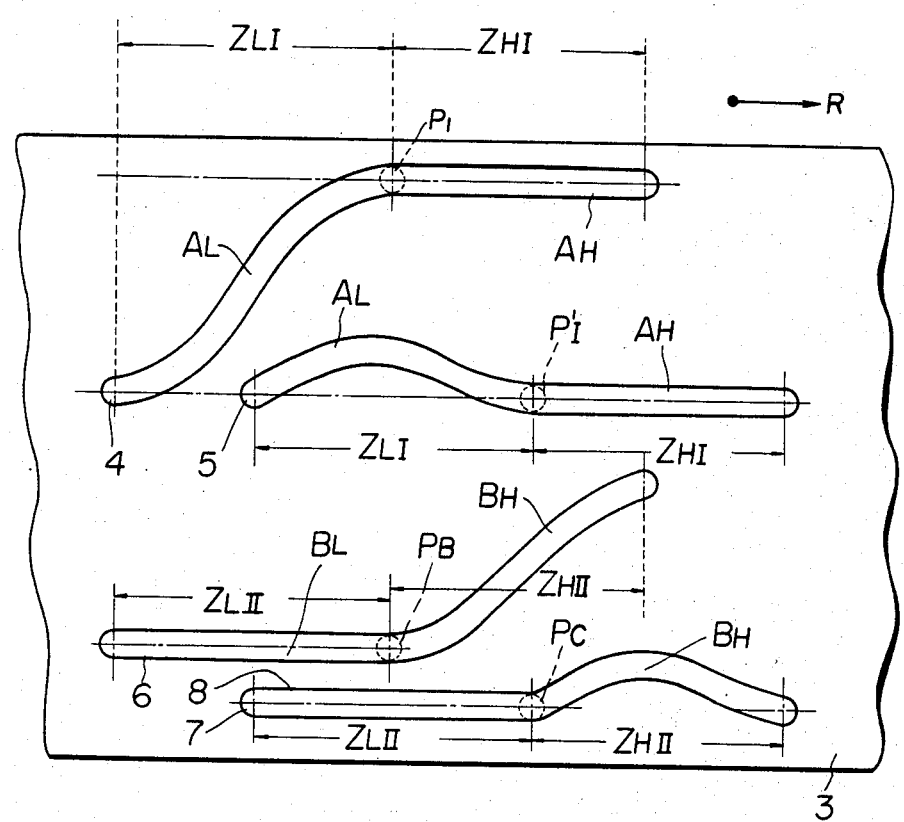
FIG. 5 is a development of the cam barrel of FIG. 4 taken along a line longitudinal of the optical axis and placed outside down.

According to the invention, the consecutive zooming movement of the four members of the front and rear assemblies I and II can be governed by means of a single cam member which is journalled on a guiding member. An example of such a single cam member is partially illustrated in FIGS. 4 and 5, wherein a rotatable cam barrel 3 has four circumferential camming grooves 4, 5, 6 and 7 formed in its inside, of which part of the spatial attitudes are illustrated in FIG. 4 and of which the development is illustrated in FIG. 5 as being placed outside down. A front pair of camming grooves 4 and 5 are respectively provided for engagement with cam followers $P_1$ and $P'_1$ rigidly secured on lens cell housing 108 and 109 (in FIG. 7) carrying the front and rear movable members of elements $G_5$, $G_6$ and $G_7$ and elements $G_8$ and $G_9$ of the front assembly, while a rear pair of camming grooves 6 and 7 are respectively provided for engagement with cam followers $P_B$ and $P_C$ rigidly secured on lens cell housings 112 and 113 (in FIG. 7) carrying compensator B of elements $G_{16}$ and $G_{17}$ and variator C of elements $G_{18}$, $G_{19}$ and $G_{20}$ of the rear assembly II.

Each of the camming grooves is characterized in attitude by having two distinct parts, that is, arcuate parts $A_L$ and linear parts $A_H$ or linear parts $B_L$ and arcuate parts $B_H$ corresponding to two varifocal ranges $Z_{LI}$ ($=Z_{LII}$) of shorter focal length, for example, from 30 mm to 300 mm, and $Z_{HI}$ ($Z_{HII}$) of longer focal lengths, for example, from 300 mm to 600 mm. The arrangement and orientation of the camming grooves are such that so long as the cam followers $P_1$ and $P'_1$ are forced to slide in their respective arcuate parts $A_L$ of camming grooves 4 and 5 for relative axial movement of the movable members of the front assembly I, the cam followers $P_B$ and $P_C$ are permitted to slide in their respective linear parts $B_L$ of camming grooves 6 and 7 so that the compensator B and variator C of the rear assembly remain axially stationary during the zooming of the movable members of the front assembly, while so long as the cam followers $P_B$ and $P_C$ are forced to slide in their respective arcuate parts $B_H$ for relative axial movement thereof, the cam followers $P_1$ and $P'_1$ are permitted to slide in the linear part $A_H$, so that the two movable members of the front assembly remain axially stationary during the zooming of the compensator B and variator C, although the camming grooves are illustrated as being offset from one another for machining and assembling purposes only.

With a control mechanism including the cam barrel of construction described, it is possible to govern the consecutive zooming movement of the four movable members of the objective to effect continuous variation in focal length of the objective throughout an extremely extended range, for example, from 30 mm to 600 mm, in such a manner that upon rotation of the cam barrel in the direction R when zooming, the movable member in the front assembly I are axially moved in variable or differential relation to each other and with respect to the stationary members to continuously vary the focal length of the objective from 30 mm to 300 mm, for example, while permitting the movable member in the rear assembly II to remain stationary. When the focal length of the objective has reached 300 mm, the cam followers $P_1$ and $P'_1$ are transferred from arcuate parts $A_L$ to linear parts $A_H$, while the cam followers $P_B$ and $P_C$ from linear parts $B_L$ to arcuate parts $B_H$, so that upon further rotation of the cam barrel in the direction R, the compensator B and variator C in the rear assembly are axially moved in differential relation to each other and with respect to the stationary member to continuously vary the focal length of the objective, for example, from 300 mm to 600 mm, while permitting the two movable members in the front assembly I to remain stationary.

Figure 6:
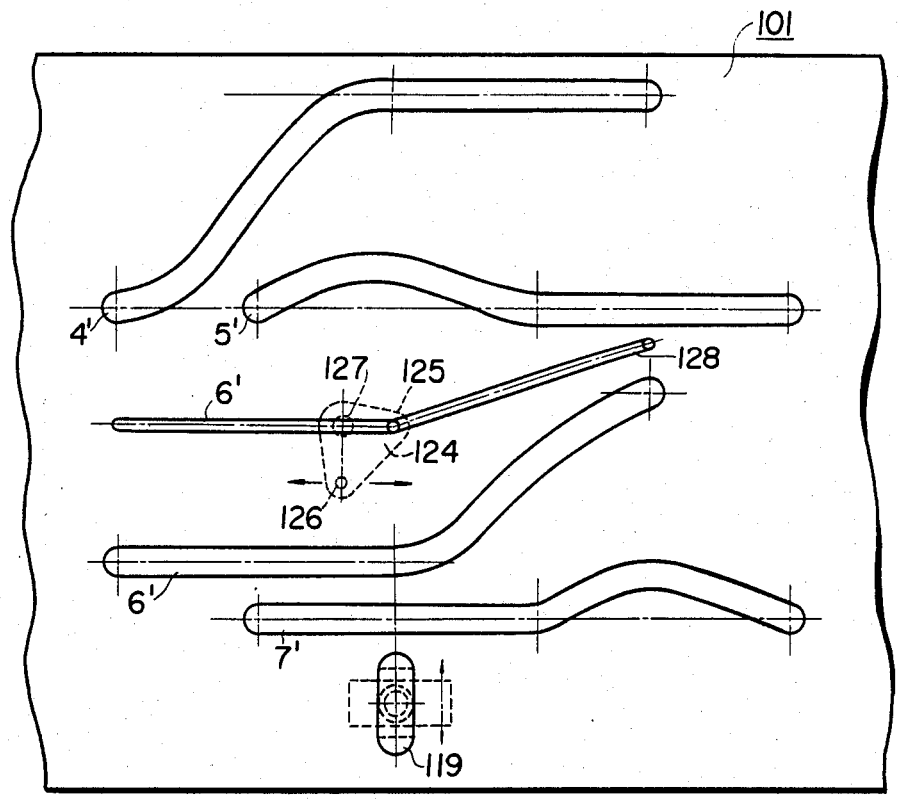
FIG. 6 is a development of the cam barrel of FIG. 4 having an additional camming groove provided for diaphragm aperture compensation.

In the latter connection, so long as the diaphragm is disposed between the rear movable member of front assembly I and the front movable member of the rear assembly II or in a space within the stationary member A, the diameter of the exit pupil of the diaphragm produced by the two movable members in the rear assembly is caused to vary by the zoom movement thereof. The provision for automatically compensating the diaphragm aperture so as to admit an axial pencil of the same angular extent as before, is made at an additional camming groove 128 formed in a cam barrel 101 as shown in FIG. 6. The diaphragm device may be of conventional construction, but it has to be provided with an aperture-compensating member 124 pivotably mounted on a sleeve 102 (in FIG. 7) at a pivot pin 127 and having mounted fixedly thereon a cam follower 125 for engagement with the camming groove 128 and a pin 126 for engagement with the aperture-compensating ring. The cam barrel 101 is further provided with a linear slot 119 elongated longitudinally of the optical axis for engagement with a range-selecting key 118 (in FIG. 8).

Figure 7:
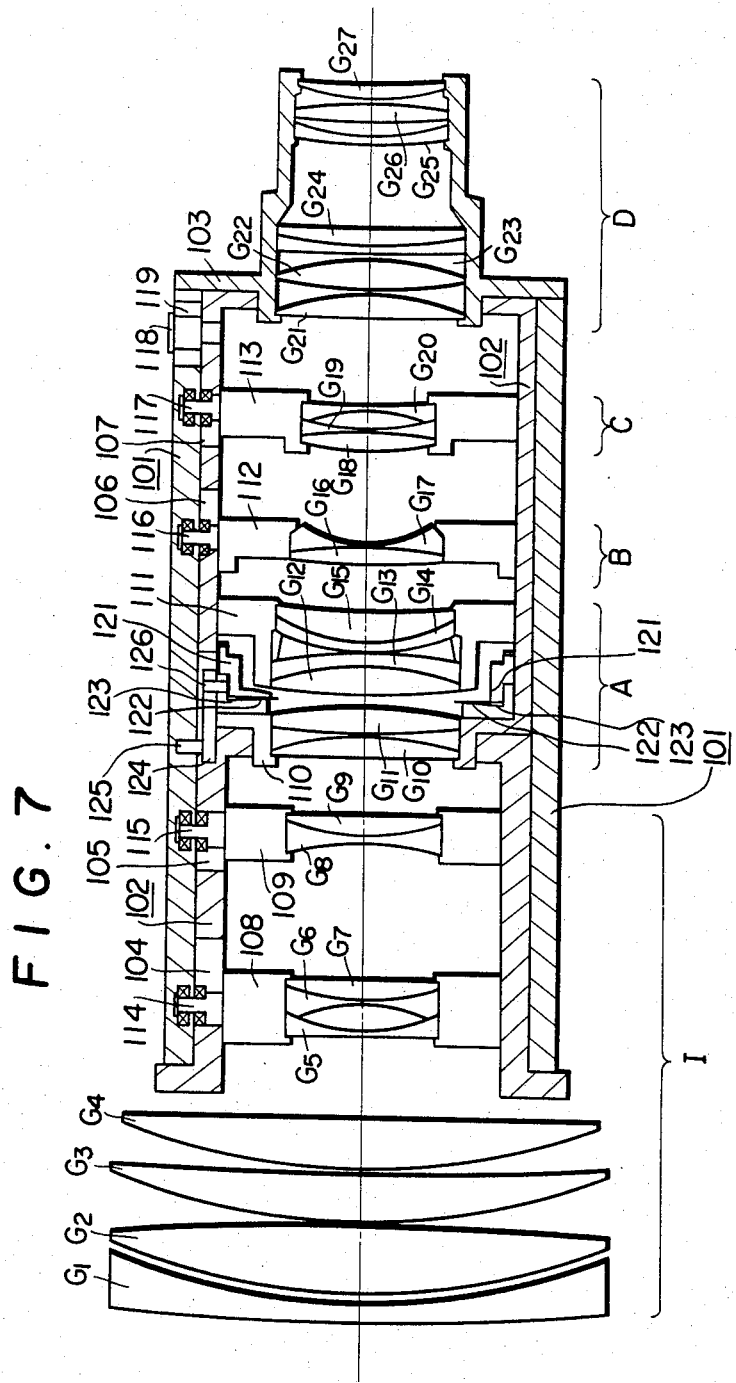
FIG. 7 is a sectional view of part of the lens mount for the optical system of FIG. 2.

In FIG. 7, there is shown a part of the lens mount for the objective optical system of FIG. 2. The lens mount is composed of the cam barrel of construction described in connection with FIG. 6 which can be journalled on a guiding sleeve 102 rigidly secured to an integral annular flange of a tubular extension 103 carrying a rear member D rigidly secured therein. The guiding sleeve carries the front member A and a diaphragm device to be described later, and has five longitudinally elongated linear guiding slots 104, 105, 106, 107 bored therein in which the cam followers 114, 115, 116 and 117 rigidly secured on lens holders 108, 109, 112 and 113 having rigidly secured therein a member of elements $G_5$, $G_6$ and $G_7$, a member of elements $G_8$ and $G_9$, a member of elements $G_{16}$ and $G_{17}$, and a member of elements $G_{18}$, $G_{19}$ and $G_{20}$ are respectively engaged and allowed to slide by means such as anti-friction bearings mounted about the cam followers. Further the cam followers are brought to engage in the camming grooves 4, 5, 6 and 7, and are allowed to slide by means such as anti-friction bearings mounted about the cam followers. Located in a space within the lens member A is a diaphragm device of conventional construction comprising a rotatable aperture-regulating ring 121 which is interlocked with an aperture regulating mechanism not shown, diaphragm blades 122 and a rotatable aperture-compensating ring 123 which is provided on the opposite side of the diaphragm blades to the aperture-regulating ring 121. The rings 121 and 123 each have a slot for engagement with individual pins planted one or two of the diaphragm blades so that upon rotation of at least one of the rings, the aperture defined by the diaphragm blades is adjusted.

Figure 8:
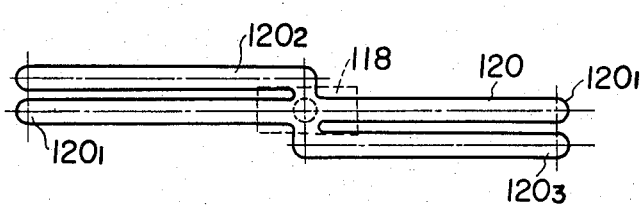
FIG. 8 is a development of a circumferential camming slot provided for selecting the varifocal range of the whole system.

In FIG. 8 there is shown a development of a camming slot that is generally indicated at 120. The camming slot 120 bored in the guiding sleeve 101 is composed of interconnected slot branches $120_1$, $120_2$ and $120_3$ in which a range-selector key 118 is engageable. When the key 118 is set at the middle position of the slot 119 (in FIGS. 6 and 7) of the cam barrel, key 118 is forced to slide in a slot branch $120_1$, so that the cam barrel is rotatable in the full angular rotation distance, thereby the focal length of the objective can be varied throughout the entire available range, i.e., from 30 mm to 600 mm. So long as the cam barrel is set at the center of the full angular rotation distance, the key 118 is movable longitudinally of the optical axis. When the key is pushed forward and is forced to engage in the slot branch $120_2$, the cam barrel is prevented from rotating in that part of the full angular rotation distance which corresponds to the range of longer focal lengths, i.e., from 300 mm to 600 mm, so that zooming movement is imparted by the rotation of cam barrel to the movable members of the front assembly alone. In order to impart zooming movement to the compensator B and variators C alone, the operator needs only to set the key 118 in the rearmost position of the slot 119, so that the key 118 is forced to engage in the slot branch $120_3$.

It will be seen from the foregoing description that the present invention contemplates the realization that a variable magnification optical system of a higher zoom ratio than has heretofore been attainable in association with a control mechanism of simple structure by the provision of four consecutively movable members. Two of such members are included in the front assembly and the other two are included in the rear assembly which, as far as the conventional zoom lens design is concerned, constitutes a stationary relay lens system. Thus a remarkable advance in the art is achieved.

What is claimed is:

1. A zoom lens system of high variable magnification ration, comprising:
    a front zoom portion and a rear zoom portion arranged along an optical axis, said front zoom portion including a lens group for focusing and a plurality of movable lens groups, and said rear zoom portion including at least one fixed lens group and a plurality of movable lens groups;
    a fixed lens barrel in which the fixed lens group of the rear zoom portion is fixed, and the movable lens group of each of the front and rear zoom portions is supported movably by a supporting member movable in the direction of the optical axis;
    a cam barrel rotatable around the optical axis with respect to the fixed lens barrel, said cam barrel having a first cam groove group engageable with an engaging portion of the supporting member of the front zoom portion, and a second cam groove group engageable with an engaging portion of the supporting member of the rear zoom portion, each groove of the first and second cam groups having a portion which acts on the supporting member and a portion which does not act on the supporting member, so that when the acting portion of the cam groove of one of the cam groove groups engages with the engaging portion the non-acting portion of the cam groove of the other cam groove group engages with the engaging portion, zooming of one of the zoom portions can be successively performed after the completion of zooming of the other zoom portion by rotation of the cam barrel.

2. A zoom lens system according to claim 1, which further comprises a diaphragm device having an aperture controlling means, and in which the cam groove has a cam groove engageable with the aperture control means, and has a portion which acts on the aperture controlling means and a portion which does not act on the same, whereby the aperture controlling means engages with the active portion of the cam groove during the zooming of the rear zoom portion.

3. A zoom lens system of high variable magnification ratio, comprising:
    a front zoom portion and a rear zoom portion arranged along an optical axis, said front zoom portion including a lens group for focusing and a plurality of movable lens groups, said rear zoom portion including at least one fixed lens group and a plurality of movable lens groups;
    a plurality of lens barrels, in each of which at least one lens group being provided, and each of the movable lens groups of the front zoom portion and the rear zoom portion being supported on the lens barrel by means of a movable lens supporting member movable along the optical axis, a one and only movable control means for moving selectively the movable lens groups of the front and rear zoom portions; and
    means for regulating the operation range of the movable control means, whereby the operation range of the movable control means is regulated so that the zooming range is regulated.

* * * * *